US005694813A

United States Patent [19]
McLaughlan

[11] Patent Number: 5,694,813
[45] Date of Patent: Dec. 9, 1997

[54] INDUSTRIAL ROBOT

[75] Inventor: Timothy James McLaughlan, Howell, Mich.

[73] Assignee: Nachi Robotics Systems Inc., Novi, Mich.

[21] Appl. No.: 717,523

[22] Filed: Sep. 23, 1996

[51] Int. Cl.$^6$ .................................................. B25J 11/00
[52] U.S. Cl. ........................ 74/490.02; 248/52; 414/918
[58] Field of Search ................. 74/490.02; 248/52, 248/51; 414/918

[56] References Cited

U.S. PATENT DOCUMENTS

| | | | |
|---|---|---|---|
| 3,180,365 | 4/1965 | Peterson | 138/134 |
| 4,427,170 | 1/1984 | Truninger | 248/51 |
| 4,675,473 | 6/1987 | Illakowicz | 174/439 |
| 4,712,972 | 12/1987 | Nakashima et al. | 248/52 X |
| 4,793,203 | 12/1988 | Staggl et al. | 414/918 X |
| 4,890,713 | 1/1990 | Pagano | 248/51 X |
| 4,955,250 | 9/1990 | Fisher | 248/51 X |
| 5,160,811 | 11/1992 | Ritzmann | 174/403 |
| 5,239,813 | 8/1993 | Baumgarten et al. | 57/425 |
| 5,283,393 | 2/1994 | Guginsky | 174/439 |
| 5,437,207 | 8/1995 | Zimmer | 414/918 X |

FOREIGN PATENT DOCUMENTS

| | | | |
|---|---|---|---|
| 2-24089 | 1/1990 | Japan | 414/918 |
| 2-218585 | 8/1990 | Japan | 414/918 |
| 2-311294 | 12/1990 | Japan | 414/918 |
| 3-121791 | 5/1991 | Japan | 414/918 |
| 3-213293 | 9/1991 | Japan | 414/918 |
| 1458226 | 2/1989 | U.S.S.R. | 414/918 |
| 1682164 | 10/1991 | U.S.S.R. | 414/918 |

*Primary Examiner*—Allan D. Herrmann
*Attorney, Agent, or Firm*—Gifford, Krass, Groh, Sprinkle, Patmore, Anderson & Citkowski, P.C.

[57] ABSTRACT

An industrial robot is disclosed having a base which is secured to a ground support surface. A robotic manipulator is pivotally mounted to the base about a predetermined axis. The base and robotic manipulator, furthermore, form a channel therebetween around at least a portion of an outer periphery of the base and the robotic manipulator. An elongated flexible tube is positioned in the channel and one end of the tube is secured to the base while the other end is secured to the robotic manipulator. The tube forms a guide for wires and/or conduits extending between the base and the robotic manipulator.

2 Claims, 1 Drawing Sheet

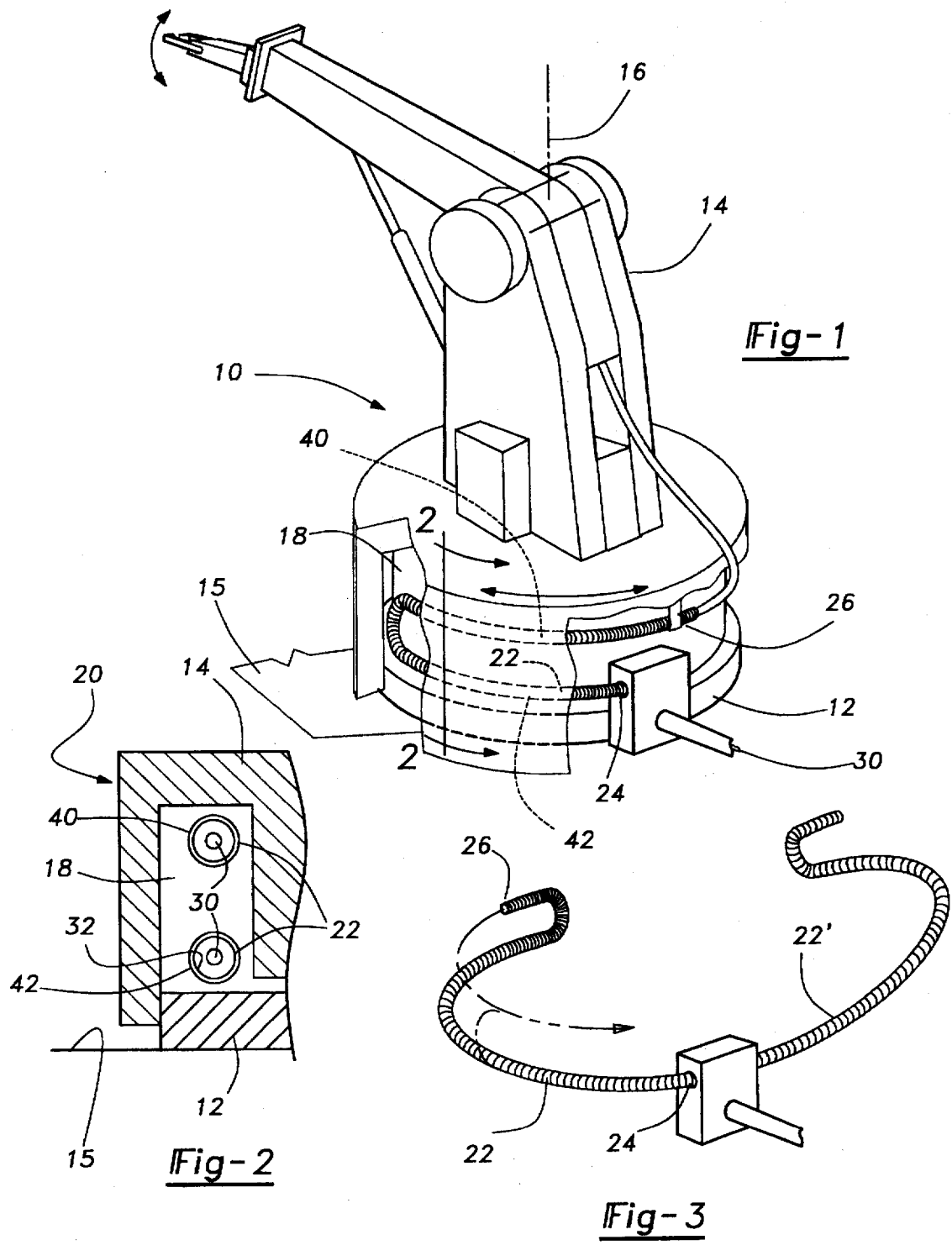

INDUSTRIAL ROBOT

BACKGROUND OF THE INVENTION

1. Field of the Invention

The present invention relates generally to industrial robots and, more particularly, to a structure for guiding and protecting wires and/or conduits extending between two moving portions of the industrial robot.

2. Description of the Prior Art

There are many different types of industrial robots of the type used in automated assembly lines. Such industrial robots are typically used not only to repetitiously move and position components, but also to perform machining operations such as welding, drilling and the like on manufactured items.

In one type of previously known industrial robot, the robot comprises a base which is secured to a ground support surface. Thereafter, a robotic manipulator is pivotally mounted about a generally vertical axis to the base so that pivotal action of the robotic manipulator relative to the base establishes a degree of freedom of movement between the base and the robotic manipulator.

One problem associated with these previously known robots is that it is oftentimes necessary to supply electrical power to the manipulator and/or fluids such as hydraulic fluid. For example, in the event that the robotic manipulator includes a welder, it is necessary to supply electrical power to the manipulator in order to power the welder.

Since the base and the robotic manipulator are movable relative to each other, it has not been previously possible to simply connect electrical wires and/or conduits directly from the base to the manipulator since relative movement between the robotic manipulator and the base would impose stresses or otherwise entangle the wires and/or conduits. Consequently, in order to supply electrical power and/or fluids, such as hydraulic fluids, to the robotic manipulator, it has been the previously known practice to connect the wires and/or conduits from an elevated support above the robot to the robotic manipulator.

This previously known solution, however, is disadvantageous for a number of reasons. First, it requires that an elevated support for the wires and/or conduits be positioned above the robot. In many cases, however, there is insufficient head room above the robot in order to facilitate such a support. Additionally, servicing and maintenance of the electrical wires and/or conduits above the robot is inconvenient, oftentimes difficult and, therefore, expensive.

SUMMARY OF THE PRESENT INVENTION

The present invention provides a robot which overcomes all of the abovementioned disadvantages of the previously know devices.

In brief, the robot of the present invention comprises a base which is secured to a ground support surface, such as a factory floor. A robotic manipulator is then pivotally mounted to the base so that the manipulator pivots about a generally vertical axis to provide a degree of freedom of movement between the base and the robotic manipulator.

The base and the robotic manipulator are constructed so that an annular channel is formed about at least a portion of the outer periphery of the base and the robotic manipulator. An elongated flexible tube is positioned in this channel and one end of the tube is secured to the base while the opposite end of the tube is secured to the robotic manipulator. Consequently, upon pivotal movement of the robotic manipulator relative to the base, the relative degree that the tube will overlie itself will vary depending upon the pivotal position of the robotic manipulator relative to the base. However, the overall length of the tube will remain fixed.

This tube is dimensioned so that electrical wires, fluid conduits and the like can be disposed through the interior of the tube thus effectively permitting electrical power, fluid and the like to be transmitted from the base, through the tube, and to the robotic manipulator. Since the overall length of the tube remains fixed, the tube protects the wires and/or conduits not only from longitudinal tension, but also protects the wires and/or conduits from chafing or otherwise mechanically abrading with the base as well as the robotic manipulator.

In the preferred form of the invention, the tube comprises an elongated compression spring. Other constructions, however, remain within the scope and intent of the invention.

BRIEF DESCRIPTION OF THE DRAWING

A better understanding of the present invention will be had upon reference to the following detailed description when read in conjunction with the accompanying drawing, wherein like reference characters refer to like parts throughout the several views, and in which:

FIG. 1 is an elevational view illustrating a preferred embodiment of the present invention;

FIG. 2 is a fragmentary sectional view taken substantially along line 2—2 in FIG. 1 and enlarged for clarity; and FIG. 3 is a diagrammatic view illustrating the preferred embodiment of the present invention.

DETAILED DESCRIPTION OF THE PREFERRED EMBODIMENT OF THE PRESENT INVENTION

With reference first to FIG. 1, a preferred embodiment of the robot 10 of the present invention is there shown and comprises a base 12 secured to a ground support surface 15 as well as a robotic manipulator 14. The robotic manipulator 14, furthermore, is pivotally mounted to the base 12 about a generally vertical axis 16 by any conventional means. Furthermore, any appropriate drive means (not shown) may be used to pivot the robotic manipulator 14 relative to the base 12 about the axis 16 to provide one degree of movement of the robotic manipulator 14 relative to the base 12.

The robotic manipulator 14 may be of any conventional construction and the robotic manipulator illustrated in the drawing is for illustration purposes only. For example, the robotic manipulator 14 can include a welder, conventional means to machine parts, conventional means to manipulate or otherwise move parts, or the like. In each case, however, it is desirable to provide electrical power and/or fluids, such as hydraulic fluids, to control the operative portions of the robotic manipulator 14.

With reference now especially to FIG. 2, the base 12 and robotic manipulator 14 are dimensioned so that an arcuate channel 18 is formed around at least a portion of the outer periphery 20 of the base 12 and robotic manipulator 14. In the preferred embodiment of the invention, this annular channel 18 extends around substantially the entire robotic manipulator 14 and base 12.

With reference now to FIGS. 1–3, an elongated flexible tube 22 is positioned within the annular channel 18. One end 24 of the tube is secured by any conventional means to the base 12 while the opposite end 26 of the tube 22 is secured to the robotic manipulator 14. Consequently, as best shown in FIG. 1, depending upon the pivotal position of the robotic manipulator 14 relative to the base 12, the tube 22 is U-shaped such that an upper portion 40 of the tube 22 overlies a lower portion 42 of the tube 22.

Since the ends 24 and 26 of the tube 22 are respectively secured to the base 12 and robotic manipulator 14, the overall length of the tube 22 remains fixed. However, the amount of overlap of the tube 22 over itself will vary as a function of the pivotal position of the robotic manipulator 14 relative to the base since the tube 22 merely winds and unwinds in the channel 18 in response to pivotal movement of the robotic manipulator 14 relative to the base 12.

The tube 22 is dimensioned so that electrical wires and/or fluid conduits 30, hereinafter collectively referred to as wires/conduits, extend through the interior 32 of the tube 22. The tube 22 thus effectively allows electrical power, fluids and the like to be operatively connected from the base 12 to the robotic manipulator 14. The tube 22, furthermore, not only guides the wires/conduits 30, but also protects the wires/conduits 30 from longitudinal tension as well as chafing and abrasion between the wire/conduit 30 and the robot base 12 or robotic manipulator 14.

With reference now especially to FIG. 3, in the preferred embodiment of the invention, the tube 22 comprises a helical spring although other types of tubes 22 may alternatively be used. Additionally, a second tube 22' can also be positioned within the channel 18 such that the tubes 22 and 22' are circumferentially spaced from each other. The provision of a second tube 22' thus increases the number of wires/conduits 30 that can be operatively connected from the base 12 to the robotic manipulator 14.

From the foregoing, it can be seen that the present invention provides a simple but highly effective system for operatively connecting wires/conduits from a base to a robotic manipulator of the type in which the robotic manipulator is pivotally mounted to the base. The tube 22 not only guides the wires/conduits but also protects the wires/conduits from abrasion and chafing with the robot 10 during the operative movement of the robotic manipulator 14.

Having described my invention, however, many modifications thereto will become apparent to those skilled in the art to which it pertains without deviation from the spirit of the invention as defined by the scope of the appended claims.

I claim:

1. A robot comprising:

a base, said base secured to a ground support surface, a robotic manipulator, means for pivotally securing said robotic manipulator to said base about a predetermined axis, said base and said robotic manipulator forming a channel therebetween around at least a portion of an outer periphery of said base and said robotic manipulator, an elongated flexible tube positioned in said channel, said tube having one end secured to said base and a second end secured to said robotic manipulator, wherein said tube forms a guide for wires/conduits extending between said base and said robotic manipulator wherein said tube comprises an elongated helical spring whereby resiliency of said helical spring maintains said helical spring in an extended condition such that an upper portion of said helical spring overlies a lower portion of said helical spring during rotation of said robotic manipulation about said predetermined axis relative to said base.

2. The invention as defined in claim 1 and comprising a second flexible tube positioned in said channel, said second flexible tube having one end secured to said base and a second end secured to said robotic manipulator, said second flexible tube being circumferentially spaced from said first mentioned tube, wherein said tube forms a guide for wires/conduits extending between said base and said robotic manipulator wherein said second flexible tube comprises a helical spring.

* * * * *